United States Patent [19]

Bouchard et al.

[11] Patent Number: 4,600,856

[45] Date of Patent: Jul. 15, 1986

[54] COMPACT LOW PRESSURE ARC DISCHARGE LAMP

[75] Inventors: Andre C. Bouchard, Peabody; Paul A. Thibault, Danvers; Rudolph V. Marcucci, Beverly, all of Mass.

[73] Assignee: GTE Products Corporation, Stamford, Conn.

[21] Appl. No.: 612,272

[22] Filed: May 21, 1984

[51] Int. Cl.⁴ .................. H01J 61/30; H01J 61/42
[52] U.S. Cl. .................. 313/25; 313/493; 313/634
[58] Field of Search .................. 313/25, 493, 634

[56] References Cited

U.S. PATENT DOCUMENTS

| 2,875,358 | 2/1959 | Rigden | 313/25 |
| 4,523,126 | 6/1985 | Hammer et al. | 313/634 X |
| 4,527,088 | 7/1985 | Bouchard et al. | 313/493 |
| 4,527,089 | 7/1985 | Bouchard et al. | 313/493 |
| 4,536,678 | 8/1985 | Bouchard et al. | 313/634 X |

FOREIGN PATENT DOCUMENTS

| 44958 | 3/1982 | Japan | 313/493 |
| 107551 | 7/1982 | Japan | 313/485 |

*Primary Examiner*—Palmer C. DeMeo
*Attorney, Agent, or Firm*—William McNeill; Carlo S. Bessone

[57] ABSTRACT

A compact fluorescent lamp employs multiple tubes frictionally fitted into apertures in a base plate to form an assembly. The assembly is fitted and positioned within an hermetically sealed envelope by means of snubbers formed on the base plate which cooperate with detent means formed on the inside surface of the envelope.

5 Claims, 5 Drawing Figures

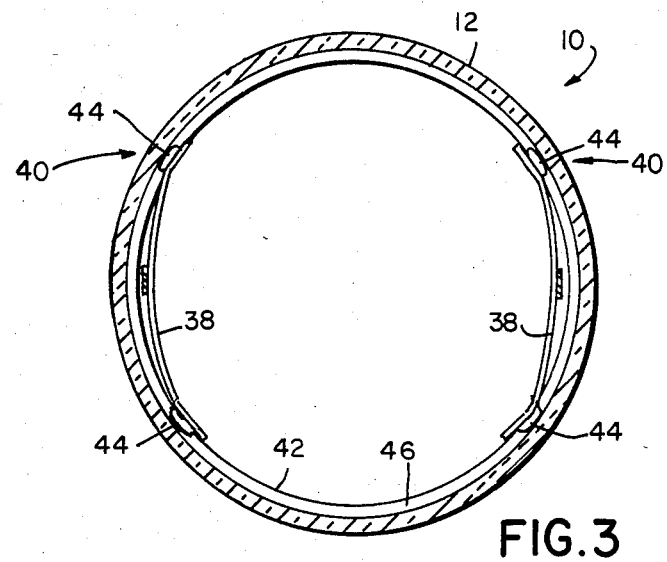
FIG. 3
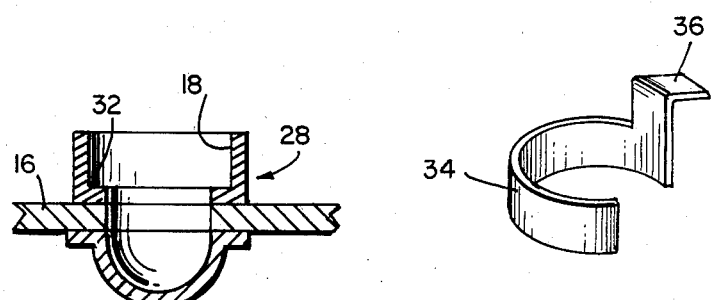
FIG. 4
FIG. 5

COMPACT LOW PRESSURE ARC DISCHARGE LAMP

TECHNICAL FIELD

This invention relates to low pressure arc discharge lamps and more particularly to compact fluorescent lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and 4,524,301, filed Sept. 30, 1982 and assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

Yet another type of compact light source is exemplified by a fluorescent lamp comprising an hermetically sealed outer envelope containing an arc generating and sustaining medium. Positioned within this outer envelope is an assembly comprised of a plurality of elongated glass tubes coated on their interior surface with a phosphor. All of the interior surfaces are open to the medium. The tubes have first and second ends and the assembly has first and second arc directing means operatively associated with the first and second ends of the tubes to provide a continuous arc path therethrough. An electrode is positioned at both ends of the arc path and means are provided for making electrical connection to the electrodes.

In an alternate embodiment, the assembly comprises a pair of U shaped tubes each having an electroded end and an open end. An arc directing means is operatively associated with the ends of the tubes and includes an arc director which connects the open end of the tubes.

Compact fluorescent lamps built according to the above provide many improvements over the prior art. Custom-made partition structures are avoided as are multiple hermetic seals. Also, since either straight tubing or simple U shaped tubes are employed, complex machinery for making multiple bends is also obviated and lamps made in accordance with this invention are economical to fabricate.

Pending applications bearing U.S. Pat. Nos. 4,536,678; 4,527,088; and 4,527,089, filed Apr. 1, 1983 and assigned to the assignee of the instant invention, disclose features of the latter two lamps and the appropriate teachings of these applications are hereby incorporated herein by reference.

DISCLOSURE OF THE INVENTION

It is, therefore, an object of the invention to enhance compact, low pressure arc discharge lamps.

It is another object of the invention to provide a rugged compact, low pressure arc discharge lamp.

These objects are accomplished, in one aspect of the invention, by the provision of a low pressure arc discharge lamp comprising an hermetically sealed, visible light transmitting envelope which contains an arc generating and sustaining atmosphere. An assembly is mounted within the envelope. The assembly comprises a base plate having first and second apertures therein and a "U" shaped, discharge path defining tube having an electrode at each end of the discharge path associated with the apertures. One end of the tube is frictionally engaged with the first aperture and the other end of the tube passes through the second aperture and is positioned by a spring clip which engages the end and is affixed to a planar surface of the base plate.

BRIEF DESCRIPTION OF THE DRAWINGS

FIG. 3 is a sectional view taken along the line 3—3 of FIG. 1;

FIG. 4 is a sectional view of an alternate embodiment of frictional engagement means; and FIG. 5 is a perspective view of a spring clip.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
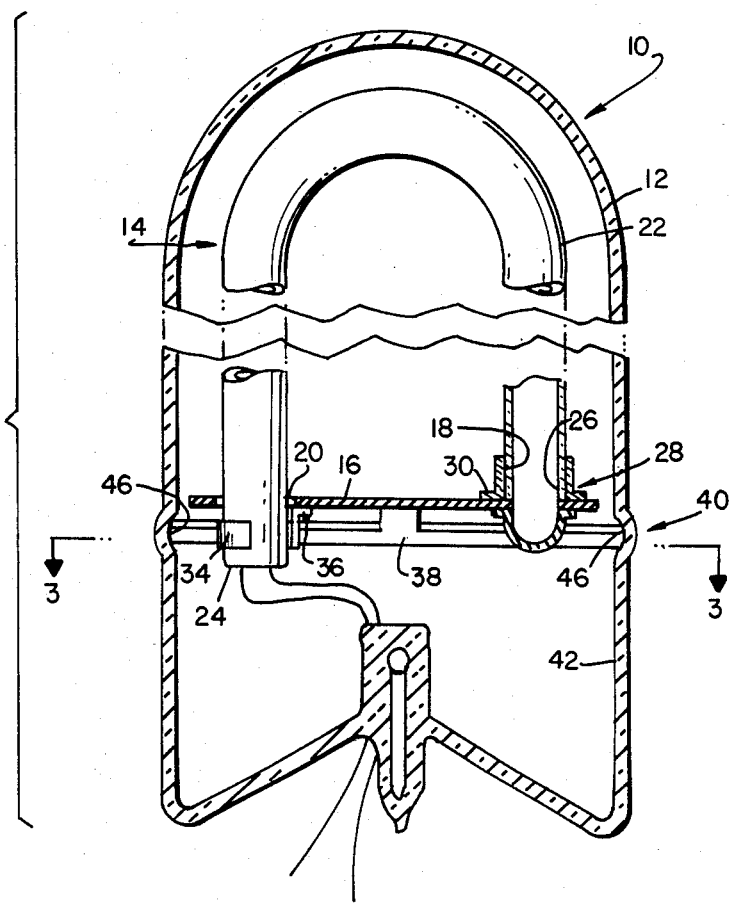
FIG. 1 is a sectional, elevational view of a lamp employing the invention.

Referring now to the drawings with greater particularlity, there is shown in FIG. 1 a low pressure arc discharge device such as a compact fluorescent lamp 10. Lamp 10 has an hermetically sealed, visible light transmitting envelope 12 which contains an arc generating and sustaining atmosphere of, for example, 20 mg of mercury and argon at a pressure of three torr.

Figure 2:
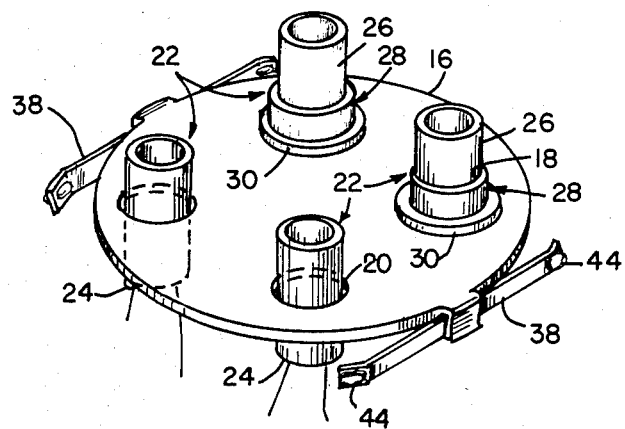
FIG. 2 is a perspective view of a base plate employed with the lamp of FIG. 1.

An assembly 14 is mounted within envelope 12 and comprises a base plate 16 having at least one first aperture 18 and at least one second aperture 20. At least one "U" shaped, discharge path defining tube 22 is associated with the apertures. In the embodiment shown (see FIG. 2) two of each type of aperture are provided and two "U" shaped tubes are employed. While it is to be understood that the advantages of this invention obtain if only one "U" tube is used, the preferred lamp employs more than one and will be described as such herein.

Each of the tubes 22 has a substantially closed end 24 carrying an electrode (not shown) and an open end 26. One of the ends, e.g., 26, is frictionally engaged with first aperture 18 and the other end, 24, passes through the second aperture 20. The configuration of second apertures 20 is not critical, however, they must be large enough to insure passage of the tube end to accommodate normal manufacturing tolerances in the spacing between the legs of the "U" shaped tubes 22.

The frictional engagement of the tube end with first aperture 18 is preferably accomplished by an upstanding boss 28 which can be affixed to base plate 16 by an outwardly extending flange 30 (FIGS. 1 and 2) or an inwardly extending flange 32 (FIG. 4). The open ends 26 of tubes 22 are connected by an arc director 34, as taught in the above-mentioned applications.

The ends of tubes 22 which pass through second apertures 20 are provided with a spring clip 34 (see FIG. 5) which has a flange 36 thereon. Flange 36 is attached to a planar surface of base plate 16 to position the end of tube 22.

The assembly 14 is positioned in envelope 12 by the fitted cooperation of snubbers 38, which are attached to base plate 16, and detent means 40 formed on the interior surface 42 of envelope 12. The snubbers 38 have protuberances 44 formed on the ends thereof and detent means 40 comprises a continuous groove 46. While individual detent means could be provided for the protuberances 44, the continuous groove is preferred since it eliminates the need for any particular alignment of assembly 14 within envelope 12.

This construction provides an economical to make, easy to assemble, yet very rugged compact fluorescent lamp. The positioning of the tubes 22 in the apertures 18 and 20 by frictional engagement provides lateral stability and longitudinal stability for the tubes. The cooperation between the snubbers and detent means provides lateral and longitudinal stability for the entire assembly, as well as providing a convenient positioning means therefor.

While there have been shown and described what are at present considered to be the preferred embodiments of the invention, it will be apparent to those skilled in the art that various changes and modifications can be made herein without departing from the scope of the appended claims.

We claim:

1. A low pressure arc discharge lamp comprising: an hermetically sealed, visible light transmitting envelope containing an arc generating and sustaining atmosphere; and an assembly mounted within said envelope, said assembly comprising a base plate having first and second apertures therein and a "U" shaped, discharge path defining tube having an electrode at each end of said discharge path associated with said apertures; one end of said tube being frictionally engaged with said first aperture and the other end of said tube passing through said second aperture and being positioned by a spring clip engaging said end and being affixed to a planar surface of said base plate.

2. The lamp of claim 1 wherein said first aperture is provided with an upstanding boss which frictionally engages said one end of said tube.

3. The lamp of claim 2 wherein said second aperture is substantially larger than the diameter of said tube.

4. The lamp of claim 1 wherein said base plate has oppositely disposed, flexible snubbers each having two ends, said ends having protuberances formed therein; said envelope having a concave groove formed in its inner surface, and said protuberances engaging said concave groove.

5. The lamp of claim 1 wherein said base plate has oppositely disposed, flexible snubbers each having two ends, said ends having protuberances formed thereon; said envelope having a plurality of detents formed on its inner surface, at least some of said protuberances engaging some of said detents.

* * * * *